June 2, 1970     F. W. McPHERSON     3,515,620

DECORATIVE, LAMINATED WOOD PANEL METHOD OF MAKING SAME

Filed Feb. 23, 1967

Frank W. McPherson
INVENTOR

BY

Kolisch + Hartwell

Attys.

United States Patent Office 3,515,620
Patented June 2, 1970

3,515,620
DECORATIVE, LAMINATED WOOD PANEL AND METHOD OF MAKING SAME
Frank W. McPherson, Longview, Wash., assignor to Pope & Talbot, Inc., San Francisco, Calif., a corporation of California
Filed Feb. 23, 1967, Ser. No. 618,106
Int. Cl. B32b 3/16
U.S. Cl. 161—38                    6 Claims

ABSTRACT OF THE DISCLOSURE

A decorative panel with face ply comprising multiple regular width strips, rough-sawn along longitudinal edges, disposed in rows with some of these rows including end-butted strips, cross-grain roughening having been applied to the face ply after its preparation with textured streaks of the cross-grain roughening extending in the direction of the line of division between end-butted strips.

---

The invention concerns the manufacture of a decorative panel. A specific embodiment of the invention comprises the manufacture of a panel for use as siding in finishing the exteriors of houses and other buildings. While the panels contemplated have particular use in such an application, it is not intended by suggesting such use that the panels of the invention be limited thereto.

Plywood panels are currently quite extensively used as siding for the exteriors of houses. The panels are relatively easily nailed into place, and frequently offer a cost advantage over such materials as discrete boards. There are certain disadvantages in the use of panels, however, which have deterred from their adoption in certain applications. A principle drawback is that plywood siding presents a relatively large, unbroken expanse over the outside of a building, with joints between adjacent panels being difficult to conceal, and the continuity of such an unbroken expanse being aesthetically unattractive to some.

A general object of the invention, therefore, is to provide a new and improved panel, feature a surfacing over at least one face thereof which effectively breaks up the appearance of continuity in such face in a highly attractive manner. The surfacing is such that adjacent panels may be butted together with the joint between adjacent panels hardly discernable.

Another object of the invention is to provide a panel with a surfacing over one face which gives to a viewer the appearance of being a series of boards disposed side by side. A construction for the panel face is selected serving to emphasize in a natural way the lines of division between the boards which are simulated over the face of the panel.

A further object is to provide a novel method of manufacturing panels with simulated board surfacing.

It has been proposed to enhance the distinctive character of wooden panel faces used in siding to roughen the faces whereby they have a rough-sawn appearance. This roughening may be done in a number of specific ways, but in general, the procedure used is to move an abrading tool across the grain in the panel's face. Thus, one specific procedure involves the actual use of a saw which is moved across the panel face in a direction extending across the grain while advancing the panel, with cutting off of a thin layer of the surface wood. Various abrading drums and other tools have also been employed for such roughening purposes. A difficulty arises in producing such a rough-sawn appearance, since in the abrading operation what might be called continuous streaks in the textural pattern appear across the grain of the panel face. As known by those skilled in the art, a timber which has been ripped along the length of its grain exhibits a rough-cut surface with a textural pattern which is not consistent over the side of the kerf produced by the saw, but instead includes streaks in the textural pattern which extend across the grain. Where a panel face has been so roughened, such streaks extend continuously across adjacent simulated board surfaces, to detract from the appearance of separate boards and to indicate that the entire panel was at one time processed as a unit. An important and distinctive feature and object of this invention is the provision of a panel and method of its preparation wherein the continuous effect of such streaking is obscured, whereby to a casual observer the face of the panel has every appearance of being made of distinct boards assembled at the building site.

A more specific object of the invention is to provide such a panel including a face ply roughened as described, where obscuring of continuity in such streaking is promoted through the use of different types of wood veneers in directly adjacent positions in the face ply which through a color and grain difference tend to divert the eye from and to render inconspicuous any continuity in such streaking, and further promoted through the use of end-butted veneer pieces in the face ply with lines of division between the veneers extending across the face ply and the grain in such face ply serving to break up the continuity of the face ply in a direction extending along the grain. Such breaking up of the continuity of the face ply is even more pronounced where the type of wood used in the end-butted veneers are distinctly different, which serves to accentuate such lines of division.

Other objects and novel features of this invention will become more fully apparent as the following description is read in conjunction with the accompanying drawings, wherein.

A panel according to a preferred embodiment of the invention may be manufactured by first preparing multiple flat-sided veneer strips of regular width, with such strips having grain extending along the length of the strips. These strips form a face ply in a completed panel, and impart to the panel an appearance of multiple boards assembled adjacent each other. As contemplated herein, rotary cut veneer, i.e., veneer peeled from a log by rotating the log against a cutting knife in a lathe, may be employed in the production of the strips.

The strips are assembled in a face ply for the panel with the strips in rows and with their flat sides lying in the plane of the face of the panel. An adhesive or so-called glue line joins adjacent strips by joining together their adjacent edges. To render such glue lines more pronounced, whereby the panel face more closely resembles separate boards assembled side by side, a process is contemplated for cutting the strips which inhibits close crowding of adjacent strips when consolidating the face ply.

Figure 1:
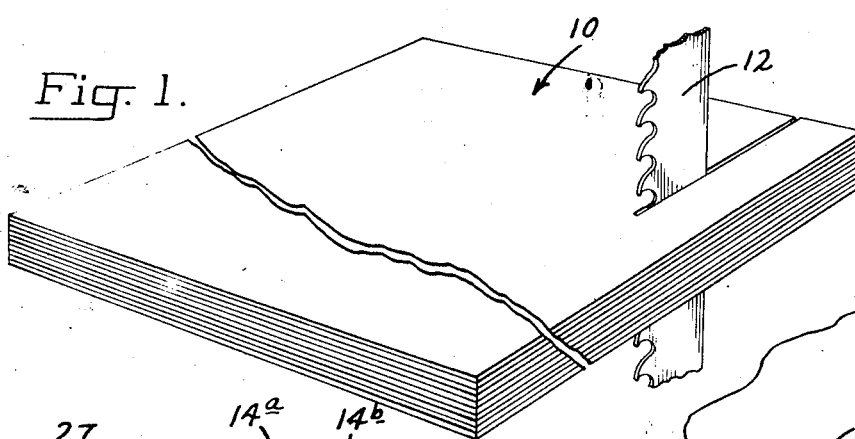
FIG. 1 is a prospective view, illustrating one of the steps in the production of veneer strips of the type employed to produce the face ply of the panel of the invention.

More specifically, in preparing the strips, such are cut from veneer with a saw so that they are bounded along opposite side margins by edges which are relatively rough in comparison with the much smoother edges that are produced when veneer is clipped with a clipper. In cutting such strips, it has been found convenient first to prepare a stack of veneer, as illustrated in FIG. 1, by stack 10, and to cut multiple strips with rough saw-cut edges at one time, by passing a saw through such stack, such as the saw indicated partially at 12. Some 1/64- and preferably 1/32-inch typically separate high and low points along a cut edge.

Figure 2:
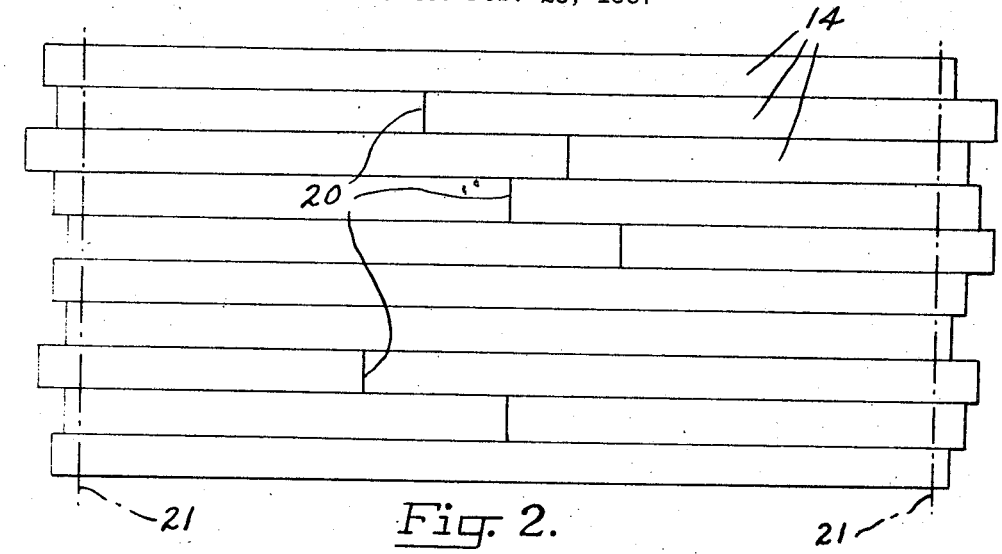
FIG. 2 illustrates an additional step in the preparation of the face ply of the panel, showing how veneer strips are laid up to produce a face ply.
Figure 3:
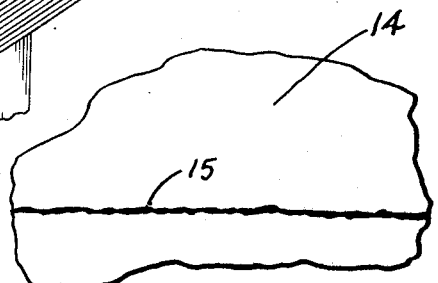
FIG. 3 is a view, on a slightly enlarged scale, showing two veneer strips as they appear in such face ply, and illustrating, in a somewhat exaggerated form, the type of glue line which is formed between such veneer strips.

The strips, after being cut, are laid up to prepare a face ply for a panel. In such preparation, the strips are arranged in rows, as illustrated in FIG. 2 where rows of strips are shown at 14, and a glue line is prepared between adjacent edges of adjacent strips for the purpose of binding the adjacent edges together. As can be seen with reference to FIG. 3, which shows portions of two adjacent strips, on a somewhat enlarged scale, because the edges of the strips are rough from the cutting, close crowding together of the strips is inhibited, rendering the glue line between the strips (shown at 15) plainly visible. Preferably, graphite or other coloring agent is included with the glue used in preparing the glue lines to make them dark in appearance.

A typical panel may have a width of four feet and a length ranging from eight to twelve feet. The strips in the face ply ordinarily extend longitudinally of such panel, and by way of example, some 10 to 20 strips of approximately 3-inch width might be utilized in forming the face ply of the panel. In a preferred embodiment of the invention, it is desirable that certain rows of the face ply contain at least two strips with ends butted together, whereby a line of division is formed between the two strips by these ends, which line extends transversely of the strips and their grain. It is also preferred that there be multiple rows in a given panel face which have such two or more strips, and that these lines of division be distributed over the face ply and be offset laterally from each other. Such laterally offset lines of division are shown in FIG. 2 at 20.

In preparing such lines of division, it is convenient to use odd lengths, which usually will result in some unevenness in the strip ends at end margins of the face ply. After the face ply has been laid up, and the glue lines between adjacent strips cured or hardened, the face ply may be trimmed along its end margins, to the approximate size of the final panel. This is important in inhibiting the chance of inadvertent damage to the face ply on further handling. In FIG. 2, the dashed lines 21 indicate where trimming takes place. Alternatively, trimming may take place after panel lay up.

Figure 5:
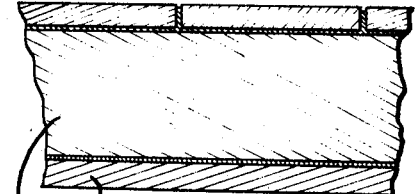
FIG. 5 is a cross-sectional view of portions of such panel.

The face ply may then be consolidated with other lamina, such as the core and back ply which constitute an underlying support layer in the panel (collectively referred to as a back) shown in FIG. 5 at 23 and 25, using procedures which are conventional in plywood manufacture. As is usual in such manufacture, and assuming the production of a three-ply product as illustrated in FIG. 5, the grain of the core layer will extend across the grain of the face ply, whereas the grain of the back ply normally substantially parallels the grain of the face ply. As is also conventional in plywood manufacture, heat and pressure may be utilized in curing the glue lines prepared between the plies in the panel. In the final product the face and back plies are bonded to the core layer.

To complete the panel manufacture, it is contemplated that the front face or the face ply be roughened, by subjecting the front face to an abrasive action extending across the grain of the veneer in the face ply. This has the effect of loosening wood fibers to produce a rough-sawn look in the veneer strip faces. Any of several procedures which have been developed may be used in this processing. For instance, as disclosed in U.S. Pat. 2,958,352, the face of the panel can be passed against a band saw with actual cutting away of a thin layer of the wood in the face ply. As disclosed in said patent, the panel is moved across the saw with the saw teeth during cutting moving across the grain of the wood. Alternatively, the panel may be passed over rollers with abrasive protrusions on the rollers serving to roughen the wood with a cross-grain abrasive action to produce a rough-sawn appearance.

Figure 4:
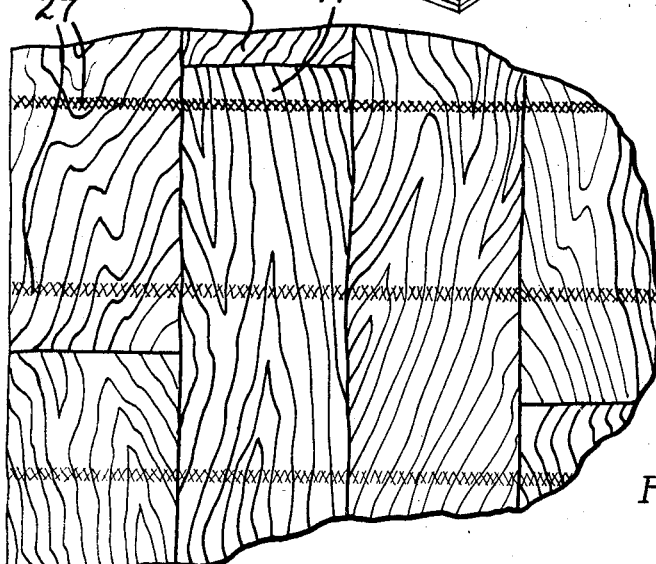
FIG. 4 is a plan view of portions of a panel face, prepared according to the concepts of the invention.

In a process of the type described, where the abrasive action producing roughening is produced by abrasive movement across the grain of the wood, streaks result in the textural pattern produced that extend across the grain. In FIG. 4, such streaks have been indicated by zones depicted by crosses shown at 27. In a conventional panel processed to have such a rough-sawn look, the presence of such streaks, since they extend across adjacent simulated boards, detracts from the appearance of separately assembled rough-cut boards.

It will be noted, however, that according to the invention this disadvantage is taken care of in a rather unique way. More specifically, and with reference to FIG. 4, because of the lines of division which are formed between end-butted veneer strips in the face ply, which lines of division extend across the grain as do the streaks referred to, a discontinuity is produced which catches the eye to divert attention from the continuity of the streaks. It has been discovered that with a panel prepared as contemplated, a viewer has little awareness that the panel was roughened with the face ply existing as a unit piece.

Because the veneer strips themselves have rough edges where they have been joined through adjacent glue lines, these rough edges, together with the roughened surfaces of the strips, combine to produce an appearance which closely simulates the appearance of actual rough-cut boards.

In preparing panels according to the invention, it is preferred to use distinctive wood, such as cedar, etc., in the production of the veneer strips. Different cedar pieces will have distinctly different coloring, depending on whether they have been selected from heart or sapwood regions (the latter in cedar being considerably lighter than heartwood), and for other reasons. It is preferred in preparing the panel face, where two strips are positioned with ends butted together, as illustrated by strips 14a, 14b in FIG. 4, that distinctly differently colored wood and differing grain patterns be employed in the two strips. An attempt has been made to visualize this effect by showing the grain in strip 14b in FIG. 4 as substantially different from the grain in strip 14a. This difference is effective to de-emphasize any continuity of streaked regions extending across the abraded panel face.

As indicated above, the panels of the invention have utility as siding in houses and other buildings. When finally assembled, the panels give every appearance of rough-sawn boards applied over the panel faces if desired.

While an embodiment of the invention has been described, including a particular type of panel and various procedures which may be employed in producing such a panel, obviously modifications and variations are possible without departing from the concepts of the invention. It is desired, therefore, to cover all modifications and variations of the invention as would be apparent to one skilled in the art, and that come within the scope of the appended claims.

It is claimed and desired to secure by Letters Patent:

1. In the manufacture of a laminated panel which includes a face ply and an underlying support layer for the face ply, the method comprising providing the support layer and preparing a face ply which covers and is bonded to the support layer, said preparation of the face ply including the steps of preparing elongated flat-sided veneer strips of regular width having grain extending longitudinally thereof with said strips having a set of flat sides and being bounded along opposite side margins by rough edges produced by saw-cutting said edges, positioning the strips in rows with their said sets of flat sides lying in the plane of the face ply and facing outwardly from the support layer and with the edges of the strips adjacent, forming elongated glue lines between adjacent edges of said strips which join said edges and are made prominent by the rough saw-cut edges of the strips which the glue lines join, and after preparation of the face ply roughening by a cross-grain abrasive action the said set of flat sides of said strips.

2. The method of claim 1, where at least one row in the face ply is prepared from two strips with ends butted together, said ends defining a line of division between the two strips which extends transversely of the strips and the grain of the strips and in substantially the same direction as the direction in which the cross-grain roughening is performed.

3. The method of claim 2, wherein multiple rows are prepared from at least two strips as set forth, and lines of division are formed by the strip ends which are distributed over the face ply and offset laterally from each other.

4. The method of claim 2, wherein wood veneers of distinctly different coloration and grain pattern are selected for the two strips which join to form a line of division.

5. The method of claim 2 wherein the face ply is laid up prior to being bonded to the support layer in the panel by laying strips of veneer edge to edge in rows, with adhesive between strips in adjacent rows, and the face ply after being laid up is trimmed and applied with bonding to the support layer in the panel, and the cross-grain abrasive action is performed after bonding of the face ply to said support layer.

6. A laminated panel comprising a back and a face ply extending over said back and bonded thereto, said face ply having an outer face which forms one face of the panel, said face ply comprising multiple elongated flat-sided veneer strips with grain extending longitudinally of the strips, said strips being disposed in parallel rows with the flat sides of the strips disposed in the plane of the panel face, said trip along opposite side of margin being bounded by rough saw-cut edges, said panel including glue lines extending between adjacent strips and made pronounced by the rough saw-cut edges, said face of the face ply having a rough cross-grain textural pattern extending across adjacent strips, at least some of the tows of the strips in the face ply comprising at least two strips with ends butted together and forming a line of division which extends transversely of the grain of the strips and in the same direction as the cross-grain textural pattern of the face ply, the veneer of the strips which have ends butted together being of differently colored wood and differing grain patterns.

References Cited

UNITED STATES PATENTS

| | | | |
|---|---|---|---|
| 2,324,628 | 7/1943 | Kahr | 161—38 |
| 2,241,080 | 5/1941 | Carpenter | 161—38 XR |
| 2,120,642 | 6/1938 | Elmendorf | 156—299 XR |
| 2,958,352 | 11/1960 | Kneisel | 143—5 XR |

PHILIP DIER, Primary Examiner

U.S. Cl. X.R.

161—40, 116; 156—265, 304, 297, 153; 52—314, 555; 143—5; 144—309

UNITED STATES PATENT AND TRADEMARK OFFICE
CERTIFICATE OF CORRECTION

PATENT NO. : 3,515,620
DATED : June 2, 1970
INVENTOR(S) : Frank W. McPherson

It is certified that error appears in the above-identified patent and that said Letters Patent are hereby corrected as shown below:

Column 6, line 6, "trip" should be --strips--.
Column 6, line 6, "of" should be deleted.
Column 6, line 6, "margin" should be --margins--.
Column 6, line 11, "tows" should be --rows--.

Signed and Sealed this

Twentieth Day of February 1979

[SEAL]

Attest:

RUTH C. MASON
Attesting Officer

DONALD W. BANNER
Commissioner of Patents and Trademarks